Aug. 6, 1935.  P. C. ACKERMAN  2,010,050
ROLLER BEARING CONSTRUCTION
Filed March 26, 1934
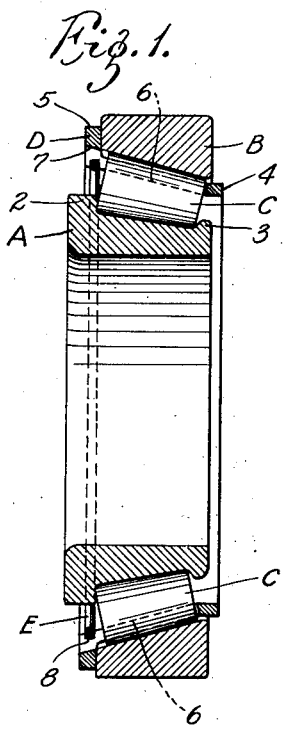
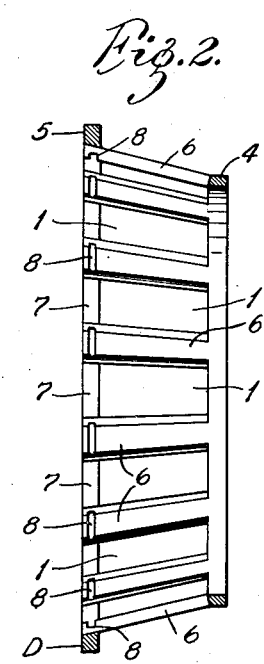
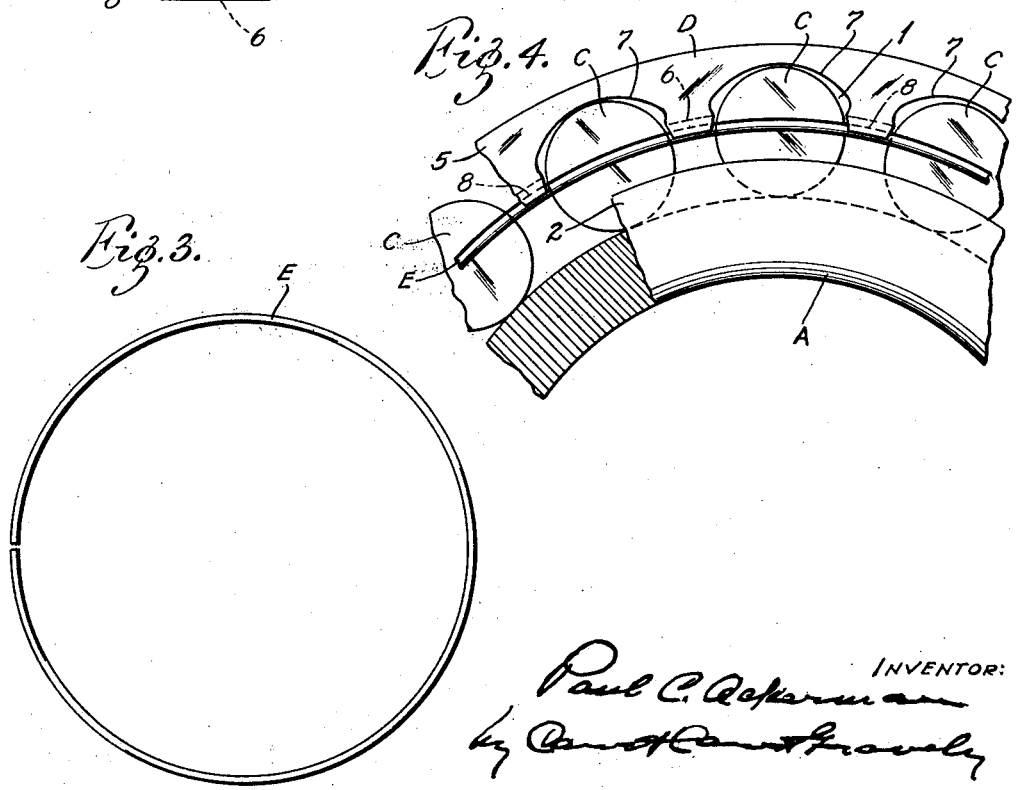
INVENTOR:
Paul C. Ackerman
by Emmett Gravely
HIS ATTORNEYS.

Patented Aug. 6, 1935

2,010,050

UNITED STATES PATENT OFFICE 2,010,050

ROLLER BEARING CONSTRUCTION

Paul C. Ackerman, Detroit, Mich., assignor to The Timken Roller Bearing Company, Canton, Ohio, a corporation of Ohio Application March 26, 1934, Serial No. 717,331

5 Claims. (Cl. 308—218)

My invention relates to taper roller bearings of the type wherein the rollers are confined in a cage and run on an inner raceway member that has ribs at each end of the raceway. This type of bearing is used to a considerable extent for very heavy duty where facility for inspection is of unusual importance.

The principal object of the present invention is to improve a bearing of the type mentioned so as to make it easy to assemble, inspect and repair by replacing any parts that may become defective.

The present invention is an improvement on the construction described and claimed in my Patent No. 1,982,896 granted December 4, 1934, wherein the cage is positioned by engagement of its large end with the outer bearing member and has its pockets extended through the large end to enable the rollers to be removed endwise. The present improvement consists in equipping the large end of the cage with a removable ring disposed opposite the ends of the rollers so as to keep the rollers in place when the outer bearing member is removed. It also consists in the combinations of parts hereinafter described and claimed.

In the accompanying drawing, wherein like reference numerals refer to like parts wherever they occur, Fig. 1 is a longitudinal sectional view of a taper roller bearing embodying my invention;

Fig. 2 is a longitudinal sectional view of the cage;

Fig. 3 is a detail view of the retaining ring; and

Fig. 4 is an enlarged fragmentary end view illustrating the mounting of the retaining ring in the large end of the cage.

The construction illustrated in the drawing comprises a cone or inner bearing member A with a tapered outer surface constituting a raceway, a cup or outer bearing member B with an inner tapered surface constituting a raceway, taper rollers C interposed between the respective raceways and a spacing cage D provided with pockets I in which the rollers are mounted. The cone A is provided with a thrust rib 2 at its large end and with a retaining rib 3 at its small end and the rollers C lie between said ribs.

The cage D is preferably made of a single piece of metal with its small end in the form of a continuous ring 4 of a radius somewhat greater than the distance from the center of the bearing to the center of the small ends of the rollers C mounted on the cone A. The large end of the cage is also a continuous ring 5 of sufficient diameter to overlap the end of the bearing cup B. These rings are connected by bridges 6 that are shaped and spaced apart to form the pockets I for the respective rollers C. The pockets I of the cage D are extended through the ring 5 at the large end of the cage D in the form of arcuate concave notches 7 that extend radially beyond the outermost portion of the respective rollers C. By this arrangement, the cage D can be moved longitudinally with respect to the rollers C and the cone A on which the rollers are mounted, in which way the cup B may be entirely removed from the rollers or merely moved back to such a point that the rollers can be tilted clear of the rib 2 at the large end of the cone and then removed by endwise movement through the concave notches 7 of the end ring 5 of the cage.

The cage thus far described is set forth and claimed in Patent No. 1,982,896 granted December 4, 1934, wherein it is particularly illustrated in connection with a double row bearing. According to the present invention, the inner end of the cage D is provided with means for retaining the rollers C in assembly with the cone A when the bearing cup B is removed. In the construction illustrated, such retaining means consists of a split ring E removably seated in an interrupted annular groove 8 provided therefor in the inner surface of the larger end of the cage D opposite the large ends of the rollers C; that is, the ring E is of smaller diameter than the diameter of the large end of the bearing cup B and the annular groove 8 in which it is seated is interrupted by the extensions of the pockets I of the cage.

By this arrangement, the cage D is prevented from moving longitudinally beyond the amount of the slight clearance usually provided and, consequently, the cone A, the rollers C and the cage remain properly assembled, even when the bearing cup A is removed therefrom. When it is desired to remove the rollers or any of them, it is only necessary to remove the retaining ring E, whereupon the cage may be moved longitudinally and the rollers removed as above described.

The improvement is especially adapted for use with bearings that are subject to exceptionally heavy duty, such as bearings of locomotive engines and roller mills. Such bearings are heavy and expensive and should be adapted for frequent and thorough inspection. By the arrangement above described, it is very quick and easy to make such inspection, make the necessary replacement and reassemble the parts.

What I claim is:

1. A cage for a roller bearing comprising continuous end rings connected by bridges that define pockets for the bearing rollers, one of said end rings having notches in its inner edge portion in continuation of the pockets between bridges and extending radially beyond said bridges and longitudinally through said ring to permit movement of the cage endwise of the rollers assembled therein, the inner surface of said cage being provided adjacent to said last mentioned end ring with an interrupted annular groove, and a retaining ring detachably mounted in said groove and extending across said notches in position to obstruct endwise passage of rollers in said pockets.

2. A one-piece conical spacing cage for tapered bearing rollers comprising a continuous ring at its small end, a continuous radially disposed ring at its large end, and bridge members extending from said small ring to the inner edge portion of said large ring and defining pockets for the respective rollers, said large ring having notches in its inner edge portion in continuation of said pockets and extending radially beyond said bridges and longitudinally through said ring to permit movement of the cage endwise of the rollers assembled therein, and a retaining ring detachably mounted in the large end of said cage opposite the ends of said rollers to obstruct removal of the rollers endwise through said notches.

3. A one-piece conical spacing cage for tapered bearing rollers comprising a continuous ring at its small end, a continuous radially disposed ring at its large end, and bridge members extending from said small ring to the inner edge portion of said large ring and defining pockets for the respective rollers, said large ring having notches in its inner edge portion in continuation of said pockets and extending radially beyond said bridges and longitudinally through said ring to permit movement of the cage endwise of the rollers assembled therein, the large end of said cage having an interrupted annular groove in its inner surface, and a retaining ring detachably mounted in said groove opposite the ends of said rollers.

4. A tapered roller bearing comprising an inner raceway member having a shoulder at each end, an outer raceway member, rollers between said members and a one-piece spacing cage having continuous end rings and pockets for said rollers, the ring at the large end having notches therethrough in continuation of the pockets and of a depth and width to avoid interference with endwise movement of the roller therein and a retaining ring detachably mounted in the large end of said cage and extending opposite the ends of the rollers therein.

5. A tapered roller bearing comprising a conical inner raceway member having a shoulder at each end, an outer raceway member, rollers between said members and a one-piece spacing cage having continuous end rings and pockets for said rollers, the ring at the large end overhanging the end of the outer raceway member and having notches therethrough in continuation of the pockets and of a depth and width to avoid interference with endwise movement of the roller therein and a retaining ring detachably mounted in the large end of said cage and extending opposite the ends of the rollers therein.

PAUL C. ACKERMAN.